United States Patent
Sarkar et al.

(10) Patent No.: US 8,107,430 B1
(45) Date of Patent: Jan. 31, 2012

(54) INTELLIGENT TRAFFIC CHANNEL ASSIGNMENT MESSAGE TRANSMISSION

(75) Inventors: Debasish Sarkar, Irvine, CA (US);
Manoj Shetty, Overland Park, KS (US);
Sachin Vargantwar, Overland Park, KS (US); Siddharth Oroskar, Overland Park, KS (US); Devesh Kumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 558 days.

(21) Appl. No.: 12/361,208

(22) Filed: Jan. 28, 2009

Related U.S. Application Data

(63) Continuation-in-part of application No. 12/209,384, filed on Sep. 12, 2008, now Pat. No. 7,990,921.

(51) Int. Cl.
*H04W 28/00* (2009.01)
(52) U.S. Cl. ........................................ 370/329; 455/451
(58) Field of Classification Search .................. 370/329, 370/338; 455/451
See application file for complete search history.

(56) References Cited

U.S. PATENT DOCUMENTS

| | | | | |
|---|---|---|---|---|
| 5,903,843 | A * | 5/1999 | Suzuki et al. | 455/452.2 |
| 6,728,544 | B1 * | 4/2004 | Boyer et al. | 455/450 |
| 2008/0076436 | A1 * | 3/2008 | Sanders et al. | 455/450 |

OTHER PUBLICATIONS

3GPP2 C.S0024,CDMA2000 High Rate Packet Data Air Interface Specification, Version 2.0, Oct. 27, 2000, p. 2-3, 6-26, 6-27, 6-57 to 6-60 (8 pages).*

* cited by examiner

*Primary Examiner* — Melvin Marcelo

(57) ABSTRACT

Disclosed herein is a method for selecting one or more capsules in which to include a traffic channel assignment message. The method may involve: (a) receiving a request from an access terminal to engage in a communication session; (b) making a determination as to whether or not the communication session is of a type that is designated for priority service; and (c) using the determination of whether or not the requested communication session is of a type that is designated for priority service as a basis for selecting one or more capsules in which to include the traffic channel assignment message. According to an exemplary embodiment, for priority communications, the TCA message is sent in all sectors identified in a route update message from the access terminal, and for non-priority communication sessions, control channel occupancy and pilot-signal strength to select sectors for the TCA message.

22 Claims, 4 Drawing Sheets

INTELLIGENT TRAFFIC CHANNEL ASSIGNMENT MESSAGE TRANSMISSION

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data connectivity.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid wireless access terminals, can communicate with both 1x networks and EV-DO networks.

In a wireless network (also referred to interchangeably as a "wireless access network" or "access network"), a traffic channel assignment (TCA) message is used to notify an access terminal of the traffic channel that is assigned to the access terminal. Thus, when an access terminal attempts to establish a connection to an access network, the access network may select a traffic channel for the access terminal, and send the access terminal a TCA message that identifies the selected traffic channel.

Furthermore, the TCA message identifying the selected traffic channel may be transmitted in multiple sectors. By sending the TCA message in multiple sectors of the access network (i.e. sending the message from multiple base stations or radio network controllers), an access network may increase the likelihood that an access terminal successfully receives the TCA message. For example, access terminals operating under EV-DO are configured to periodically transmit a route update message, which identifies sectors as potential handoff candidates, and specifies the pilot-signal strength of those sectors. Accordingly, the TCA message may be transmitted in the access terminal's serving sector, as well as the sectors reported in the route update message.

OVERVIEW

Sending a TCA message in multiple sectors may help to reduce the latency an access terminal experiences when connecting to an access network and/or when handing off a connection during a communication session. In particular, the setup or handoff of a communication session may be delayed while an access terminal waits to receive a TCA message identifying the traffic channel for the access terminal. By sending a TCA message more frequently and/or from more sources, an access network may reduce the time an access terminal spends waiting to receive the TCA message, and thus reduce the latency experienced by the access terminal. However, each transmission of a TCA message increases control channel occupancy, and under EV-DO, the control channel is time-division multiplexed with the traffic channel. Therefore, sending a TCA message more frequently may reduce data throughput and/or quality of service in a given coverage area.

In one aspect, a method that may be carried out in a wireless access network is disclosed. The wireless access network may provide wireless service in a coverage area that includes a plurality of sectors. The method comprises (a) receiving a request from an access terminal to engage in a communication session; (b) making a determination as to whether or not the communication session is of a type that is designated for priority service; and (c) using the determination of whether or not the requested communication session is of a type that is designated for priority service as a basis for selecting one or more sectors in which to transmit a traffic channel assignment message. The method may further involve transmitting the traffic channel assignment message in each selected sector.

According to an exemplary embodiment, if the requested communication session is designated for priority service, the TCA message is sent in all sectors identified in a route update message received from the access terminal. On the other hand, if the requested communication session is not designated for priority service, control channel occupancy and/or pilot-signal strength are used to select sectors in which to send the TCA message.

In another aspect, a method that may be carried out in a wireless access network is disclosed. The wireless access network may provide wireless service in a coverage area that includes a plurality of sectors. The method comprises (a) receiving a request from an access terminal to engage in a communication session; (b) determining control channel occupancy for at least a portion of the wireless access network; and (c) using the determined control channel occupancy as a basis for selecting one or more sectors in which to transmit the TCA message. Further, if the control channel occupancy is greater than a determined threshold occupancy, the method may involve using pilot-signal strength in one or more sectors identified in the route update message as a further basis to select the one or more sectors in which to transmit the TCA message In another aspect, a system configured to select one or more sectors in a wireless access network for a transmission of a TCA message is disclosed. The system comprises (i) a communication interface configured to engage in a communication session with an access terminal; (ii) a processor; and (iii) instructions stored in data storage and executable by the processor to (a) make a determination as to whether or not the communication session is of a type that is designated for priority service; and (b) use the determination as to whether or not the communication session is of a type that is designated for priority service as a basis to select one or more sectors for a transmission of a traffic channel assignment message.

The system may be further configured to determine control-channel occupancy in at least a portion of the wireless access network and use the control-channel occupancy as a further basis to select the one or more sectors for the transmission of the traffic channel assignment message. Yet further, the system may be configured to determine a pilot-signal strength for each sector that is identified in a route update message received from an access terminal and use the pilot-signal strength for the identified sectors as a further basis to select the one or more sectors for the transmission of the traffic channel assignment message.

In an exemplary embodiment, the system is configured to (i) receive a route update message from the access terminal, wherein the route update message identifies one or more sectors; (ii) if the communication session is designated for priority service, select all sectors identified in the route update message; and (iii) if the communication session is not designated for priority service, (a) determine control-channel occupancy in at least a portion of the wireless access network; (b) if the control-channel occupancy is less than or equal to a threshold occupancy, select all sectors identified in the route update message; and (c) if the control-channel occupancy is greater than the threshold occupancy, select only those sectors that are identified in the route update message and have a pilot-signal strength greater than a pilot-signal strength threshold.

The system may also include a database identifying one or more types of communication sessions that are designated for priority service. As such, the system may be further configured to query the database to determine whether or not the requested communication session is designated for priority service.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

I. Wireless Network Architecture

Figure 1:
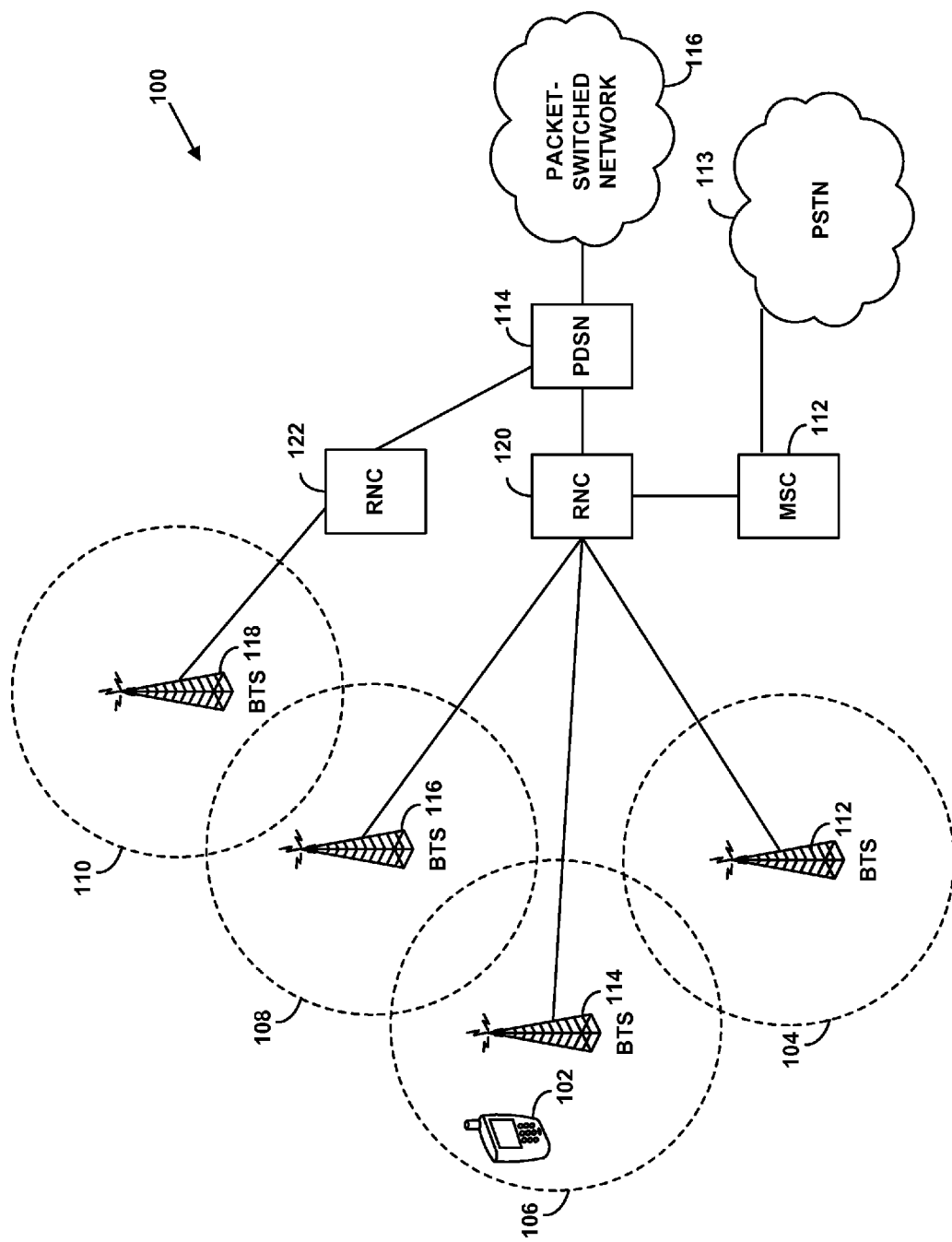
FIG. 1 is a block diagram illustrating a wireless access network, according to an exemplary embodiment.

FIG. 1 is a simplified block diagram illustrating a wireless access network 100, which may also be referred to as a radio access network (RAN). In order to provide wireless service, access network 100 may include numerous base transceiver station (BTS) towers, such as BTSs 112-118, which together provide substantially contiguous coverage for wireless subscribers. Each BTS 112-118 can be configured to define a respective cell site, as well as number of cell sectors, such as sectors 104-110. Groups of BTS towers in a given region will then typically be connected with a radio network controller (RNC) (also known as a base station controller (BSC)). In access network 100, BTSs 112-116 are connected to RNC 120, and BTS 110 is connected to RNC 122. An RNC may then connect with a switch, such as mobile switching center (MSC) 121, which provides connectivity with a transport network, such as a public switched telephone network (PSTN) 128, or with a gateway, such as a packet-data serving node (PDSN) 124, which provides connectivity with a packet-switched network 126 such as the Internet.

With this arrangement, when an access terminal 102 (such as a cellular telephone or wirelessly-equipped portable computer or personal digital assistant, for instance) is positioned in a sector, the access terminal 102 may communicate via an RF air interface with a serving BTS. For instance, when access terminal 102 is located in sector 106, the access terminal may connect to BTS 114. Consequently, a communication path can be established between the access terminal 102 and PSTN 128 or packet-switched network 126 via an RF air interface, BTS 114, RNC 120 and MSC 121 or gateway PDSN 124, respectively.

Communications between access terminal 102 and BTS 114 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), and/or Bluetooth, among others. Air interface communications from the base station to the access terminal may be referred to as "forward link" or "downlink" communications, while those from the access terminal to the base station may be referred to as "reverse link" or "uplink" communications.

To provide the arrangement of FIG. 1 in practice, each access terminal is commonly equipped with a "mobile station modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by base station 108 include EV-DO. By way of example, each cell site modem can be a Qualcomm CSM6800™ chipset, and each mobile station modem can be an MSM6800™ chipset. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including upgrades to the chipsets named herein, as well as others providing similar functionality, may also be utilized without departing from the scope of the invention.

II. EV-DO Communications

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, a Medium Access Control (MAC) channel, a "control" channel, and, if any traffic exists, a forward traffic channel.

A. Pilot Channel and Pilot Signal

The pilot channel may be used for signal acquisition, synchronization, demodulation, and decoding, as well as Signal-to-Noise Ratio (SNR) estimation. In particular, each wireless coverage area in EV-DO may be defined by one or more carrier frequencies and a PN offset, and the pilot channel carries an indication of this information.

An access terminal may then receive pilot signals from one or more coverage areas and determine signal conditions (e.g., measured as a carrier-to-interference (C/I) ratio, or a signal-to-interference-plus-noise ratio (SINR)) of each detected pilot signal. Based on the signal conditions determined by the access terminal 102, the access terminal 102 and/or the access network 100 may generate a dynamic list of "active" coverage areas for the access terminal 102 (known as the access terminal's "active set"), which typically includes the strongest coverage areas of the access network 100 as detected by the access terminal 102. The access terminal's active set may be maintained by both the access terminal 102 and the access network 100, and may include a PN offset and signal strength for each included coverage area (e.g., of which there can be up to three or six according to current standards).

The access terminal may report the forward-link air-interface conditions it is experiencing to the access network by sending a Route Update Message (or a Pilot Strength Measurement Message (PSMM)) to the access network, which identifies and provides the signal strength for each sector in its active set. The access network may then allocate resources for the access terminal (e.g., a traffic channel identified by MAC identifier) in each coverage area in the active set. The access terminal updates its active set periodically to reflect changing air-interface conditions, and notifies the access network of changes to its active set through subsequent route update messages.

B. MAC Channel

Under EV-DO, the MAC channel includes information for those access terminals that are active in a sector (i.e., that have established connectivity to the base station serving the sector). In particular, the MAC channel provides data rate control (DRC) mechanisms to control the data rate that an access terminal should use on the forward link. (The forward-link data rate is generally determined based on the SNR for the access terminal.) The MAC channel includes a number of sub-channels, which are each identified by a unique MAC index. Each MAC subchannel is spread by a Walsh code, which, in EV-DO, is either a 64-bit or 128-bit Walsh code. In practice, the MAC channel may include 128 sub-channels, identified by MAC indices of 0 to 127, respectively.

C. Traffic Channel and Control Channel

The traffic channel is used for transmission of user data (e.g., the data making up an incoming communication, incoming file, etc.) from a base station to an access terminal. In EV-DO, the traffic channel is time-division multiplexed with the control channel and is used by only one access terminal in each time slot. To accommodate this configuration, a scheduler is used to assign a particular access terminal for each time slot. As such, each packet sent on the traffic channel includes a preamble, which in turn includes a MAC Index indicating the access terminal for which the packet is intended. The scheduler may be integrated into an RNC or exist as a separate entity that monitors and schedules user data being sent from one or multiple RNCs.

Since the control channel is time-division multiplexed with the traffic channel, the base station specifies to an access terminal when user data is being transmitted (i.e. when the traffic channel is in use), and when control channel information is being transmitted (i.e. when the control channel is in use). To do so, the base station may use certain MAC sub-channels with certain MAC index values. For instance, in EV-DO, a MAC index equal to "2" is used to indicate that user traffic follows (and that the traffic channel is in use), while a MAC index equal to "3" indicates that control channel information follows (and that the control channel is in use). These MAC index values are reserved for this channel coordination information, and therefore are not assigned to identify any particular access terminal.

Control channel information may be sent over the control channel in a control channel "capsule," which is a packet or set of packets that may be sent from time-to-time in the control channel. In EV-DO, control channel information may be sent in a "synchronous capsule" and/or an "asynchronous capsule." Synchronous capsules are sent periodically, typically at intervals that are multiples of 256 time slots. Asynchronous capsules, on the other hand, may be sent as needed, in any time slot in which a synchronous capsule is not being transmitted.

D. Assigning a Traffic Channel Using a TCA Message

When a user connects to an access network via a BTS and/or RNC, the access network assigns a traffic channel to the access terminal so that the network scheduler sees the access terminal as active and allocates timeslots to the access terminal for its communications. Typically, a user will request to connect to the access network, although it is also possible that the access network may initiate a connection. When a BTS receives a request to connect from an access terminal, the BTS sends a TCA message to the access terminal, which notifies the access terminal of its assigned air-interface traffic channel. In an exemplary embodiment, each TCA message includes a Walsh Code and/or a MAC Index that corresponds to the assigned traffic channel. In access networks operating under the EV-DO air interface protocol, the access network (e.g., an RNC and/or BTS) multicasts the TCA message in one or more sectors. To do so, the access network may include the TCA message in the synchronous capsule and/or the asynchronous capsule of the control channel in each sector.

Upon receipt of the TCA message, the access terminal tunes to the assigned traffic channel (as indicated by the Walsh code and/or MAC Index in the TCA message) and receives blank frames transmitted by the base station. The access terminal then confirms receipt of the blank frames by sending a preamble of blank frames to the base station. In turn, the access terminal acknowledges receipt of the blank frames by sending an Acknowledgement Order message to the access terminal. The access terminal then acknowledges with an Acknowledgement Order message to the base station over the traffic channel.

Recent chipsets, such as those incorporating Motorola's feature release 9344 (FR9344), may provide additional modes for sending TCA messages. In FR9344, the default mode (TCA_Transmit_Mode=0), a TCA message is sent in the asynchronous capsule when the route update message includes only one sector, and in the synchronous capsule of each reported sector, when the route update message includes multiple sectors. In a first alternative mode (TCA_Transmit_Mode=1), the TCA message is sent in the asynchronous capsule at the sector of access when the access terminal reports a single sector in the route update message. Alternatively, when the access terminal reports multiple sectors, the TCA message is sent in the asynchronous capsule at the sector of access and in the synchronous capsule in all other reported sectors. In a second alternative mode (TCA_Transmit_Mode=2), the TCA message is sent in the asynchronous and synchronous capsules at the sector of access, and in synchronous capsule in all other reported sectors (if more than one sector is reported in the route update message).

III. Selection of Sectors for Transmission of a TCA Message

According to an exemplary embodiment, when an access terminal requests connectivity for a communication session that is designated for priority service, the access network transmits a TCA message in all sectors that were identified by the access terminal in its last route update message. Otherwise, for non-priority communications, the network uses a number of factors, such as control channel occupancy and/or pilot-signal strength, to select sectors in which to transmit the TCA message. In practice, communication sessions that are sensitive to latency may be designated for priority service so that a traffic channel for the session can be more rapidly assigned, thus helping to reduce the latency experienced while waiting for the TCA message. For example, communication sessions involving QChat and other push-to-talk (PTT) applications may be latency-sensitive, and therefore may be designated for priority service.

Figure 2:
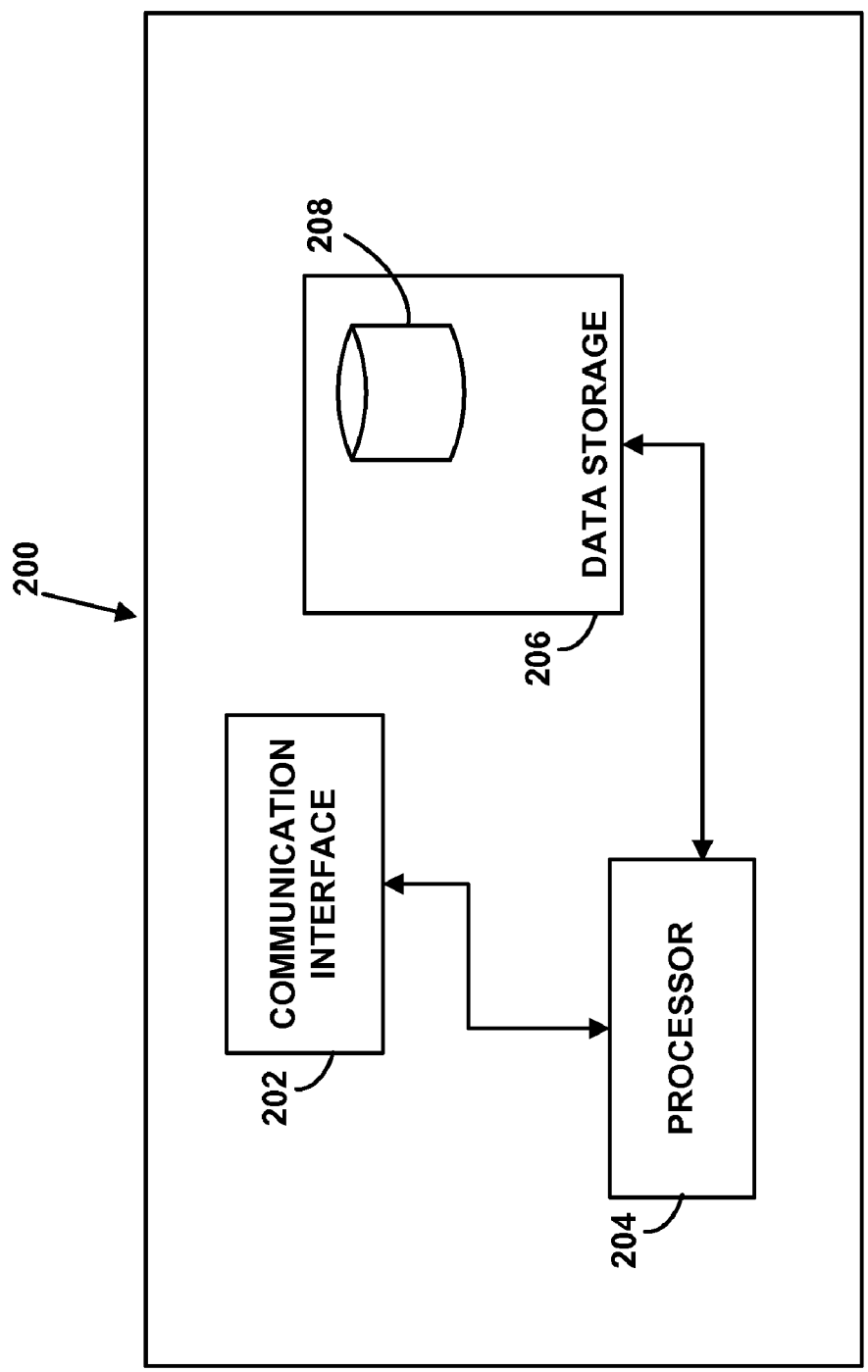
FIG. 2 is a block diagram illustrating an exemplary system that is configured to select one or more capsules in which to include a traffic channel assignment message.

FIG. 2 is a block diagram illustrating an exemplary system 200 that is configured to select one or more sectors in which to transmit a traffic channel assignment message. The system includes a communication interface 202, a processor 204, and data storage 206. Processor 204 may be configured interact with and/or control communication interface 202 to provide functionality described herein. Further, processor 204 may be configured to execute instructions stored on data storage 206 to carry out the functionality of system 200 described herein. The instructions may take the form of executable program code, or may take other forms as appropriate.

System 200 is configured to receive a request from an access terminal to engage in a communication session, and to engage in the requested communication session with the access terminal. Further, system 200 may periodically receive a route update message from an access terminal, or periodically receive information included in a route update message from another entity that receives the route update message from the access terminal.

System 200 may also be configured to determine whether or not the communication session is of a type that is designated for priority service and use this determination as a basis to select one or more sectors for a transmission of a TCA message. Further, the system 200 may be configured to determine control-channel occupancy in at least a portion of the wireless access network, and use the control-channel occupancy as a further basis to select the sectors for a transmission of a traffic channel assignment message. Yet further, the system 200 may be configured to determine pilot-signal strength for each sector identified in a route update message received from an access terminal, and use the pilot-signal strength of the identified sectors as a further basis to select the sectors for the TCA message.

In an exemplary embodiment, when an access terminal attempts to connect for a communication, the system 200 determines if the requested communication is designated for priority service. For a priority communication, the system then selects all sectors in the most-recently received route update message from the access terminal. For a non-priority communication, the system determines control channel occupancy in the sector of access, and if the control channel occupancy is less than or equal to a threshold occupancy (70% occupied, for example), then the system selects all sectors in the most-recently received route update message. If the control channel occupancy is greater than the threshold occupancy, the system determines the pilot-signal strength in each sector identified in the most-recently received route update message, and selects only those sectors having a pilot-signal strength above a predetermined pilot-signal strength threshold. System 200 may then transmit the TCA message in the selected sectors.

In an alternative embodiment, the system 200 may determine the control channel occupancy level for the sector of access, and for the sectors included in the access terminal's active set. The system 200 may accordingly be configured to compare the occupancy level in each sector, to a threshold occupancy for that sector. The TCA message may then be transmitted in those sectors in which the control channel occupancy is less than the respective threshold occupancy. Or, in a further alternative, the system may base selection of sectors for the TCA message upon both the control channel occupancy and pilot-signal strength in each individual sector. Other variations using communication-type, control channel occupancy, and/or pilot-signal strength are also possible.

System 200 may further include or have access to a database 208. In particular, database 208 may be stored in data storage 206 (as shown), or may be stored remotely and accessed by system 200 on an as-needed basis. Database 208 may include data that indicates whether or not various types of communication sessions are designated for priority service. Accordingly, system 200 may be configured to access or query the database 208 to determine whether or not a requested communication session is of a type that is designated for priority service. Further, system 200 may be configured to populate and/or edit database 208 to define and/or update which types of communications are designated for priority service.

As noted, the system may be implemented in a wireless access network. Accordingly, one skilled in the art will understand that an exemplary system may be implemented in various entities or combinations of entities in a wireless access network. For instance, the system may be integrated into an RNC, a session controller, a BTS, or various combinations of these and other network entities. Alternatively, the system may be implemented in an entity or entity that are separate from and in communication with an access network. Other implementations of the system are also possible.

Figure 3:
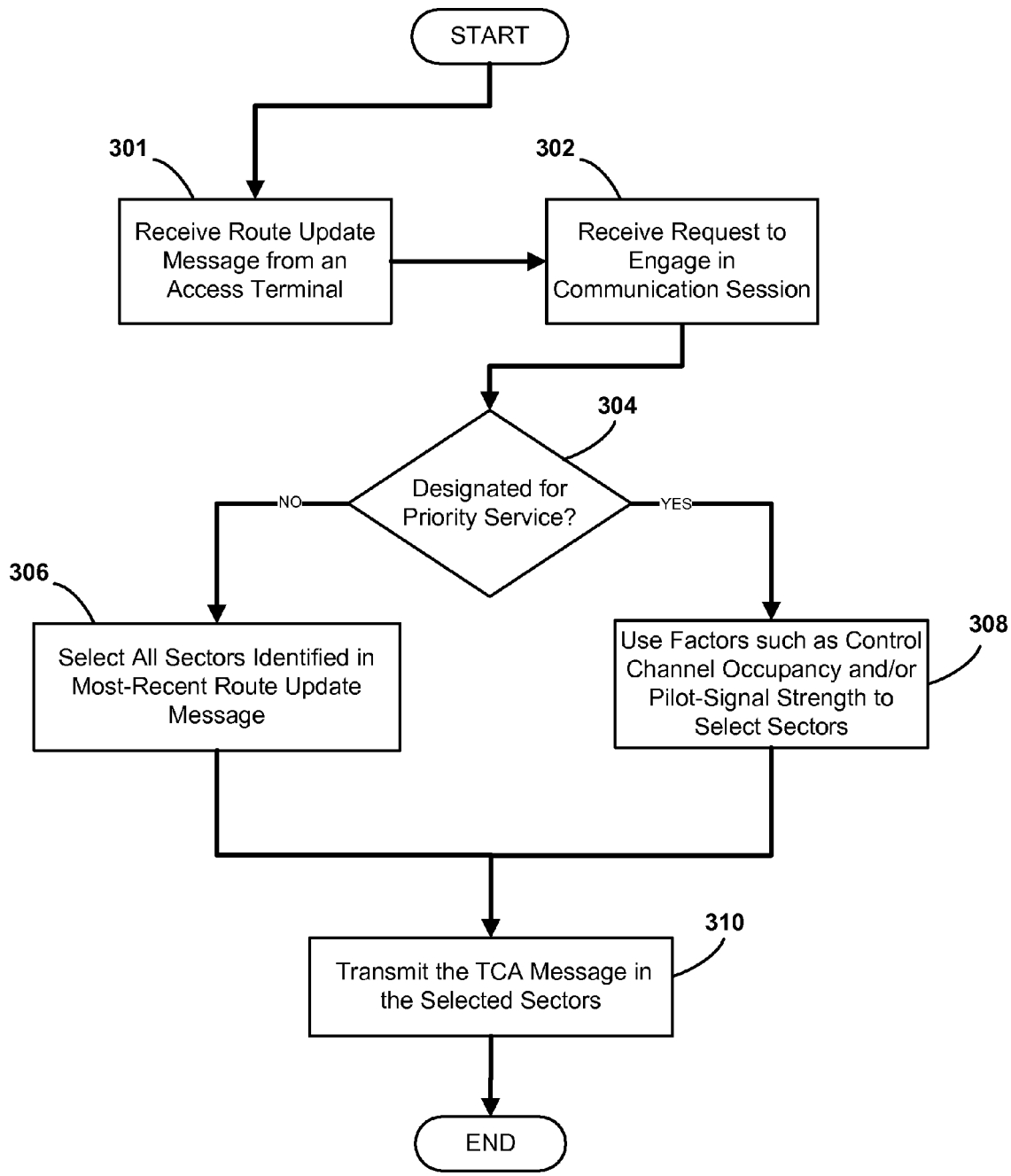
FIG. 3 is a flow chart illustrating a method for selecting one or more control channel capsules in which to send a traffic channel assignment message, according to an exemplary embodiment.

FIG. 3 is a flow chart illustrating an exemplary method for selecting one or more sectors in which to transmit a TCA message. The method may be implemented in a coverage area of a wireless access network that includes a plurality of sectors. The method involves the network receiving a route update message from an access terminal, as shown by block 301. The network also receives a request from an access terminal to engage in a communication session, as shown in block 302. Further, the network determines whether or not the communication session is of a type that is designated for priority service, as shown in block 304.

The network then uses the determination of whether or not the requested communication session is of a type designated for priority service as a basis for selecting one or more sectors in which to transmit the TCA message. For instance, in an exemplary embodiment, if a communication session is designated for priority service, the network selects all sectors that were identified by the requesting access terminal in its most-recent route update message, as shown by block 306. If, on the other hand, the communication session is not designated for priority service, the network uses various factors, such as the control channel occupancy and/or pilot-signal strength of the sectors in the last-received route update message from the access terminal, to select the sectors in which to send the traffic channel assignment message, as shown by block 308. The network may then transmit the TCA message in each of the selected sectors, as shown by block 310.

The method may further involve designating one or more types of communication sessions for priority service. For example, QChat and other types of push-to-talk (PTT) communications, and/or any other communications that are latency-sensitive, may be designated for priority service. More generally, any type of communication session requiring or benefiting from more efficient session setup and/or handoff, may be designated for priority service.

It should be understood that the order in which the functionality of blocks 301-310 is carried out may vary. For instance, a route update message may be received prior to, in conjunction with, or shortly after receiving a communication session request. As such, the determination of whether or not the communication session is of a type that is designated for priority service may occur before or after receiving the route update message. Other examples and variations are also possible.

Figure 4:
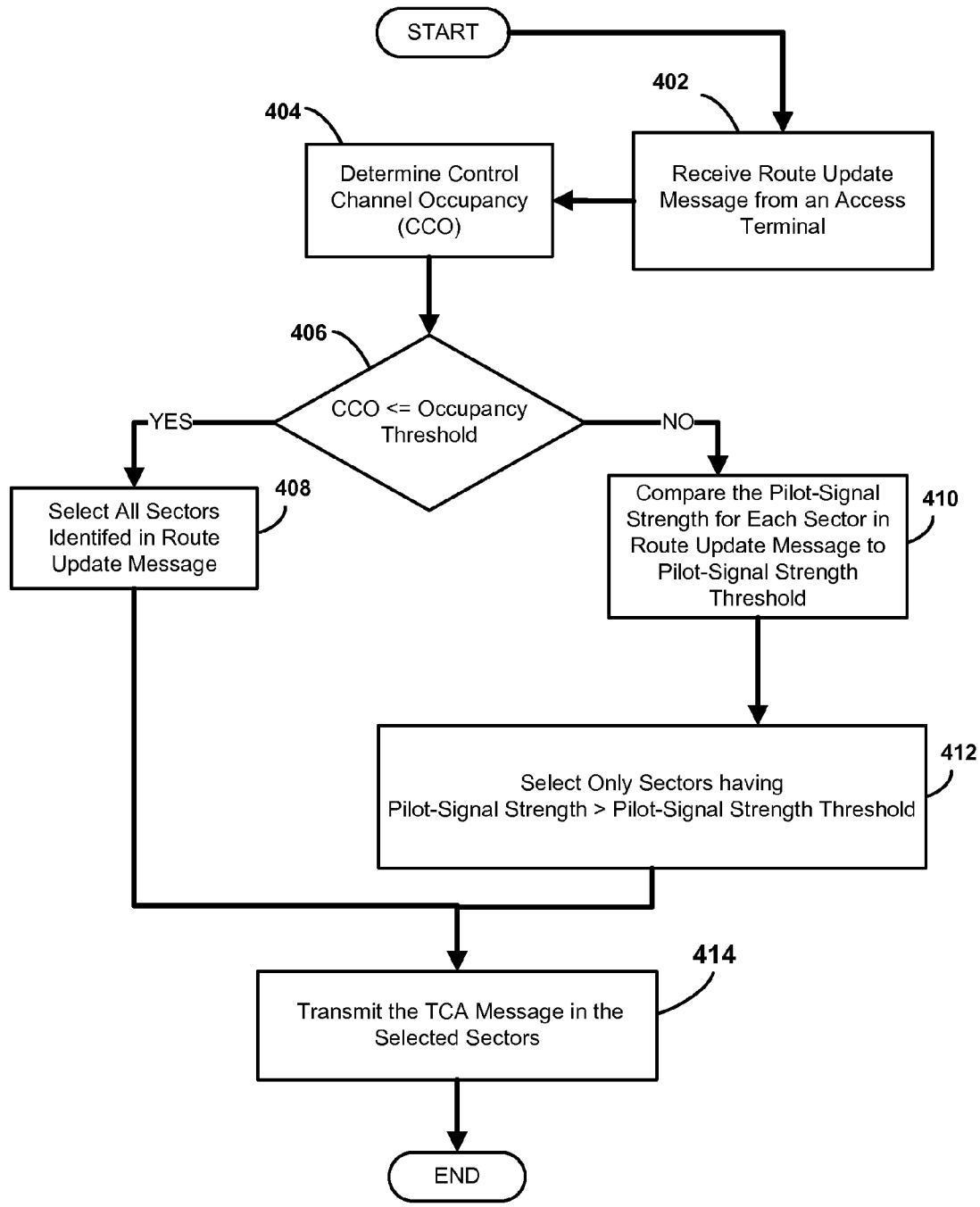
FIG. 4 is another flow chart t illustrating a method for selecting one or more control channel capsules in which to send a traffic channel assignment message, according to an exemplary embodiment.

FIG. 4 is another flow chart illustrating a method for selecting one or more sectors in which to include the TCA message. In particular, FIG. 4 illustrates the use of control channel occupancy and relative pilot-signal strengths to select the sectors for the TCA message. According to an exemplary embodiment, this selection method is carried out once it has been determined that the requested communication session is not designated for priority service. However, it should be understood that this method might be used with priority and non-priority communication sessions, without departing from the scope of the invention.

Referring to the illustrated method, the access network may receive a route update message from an access terminal that is engaged, or requesting to engage, in a communication session via the network, as shown by block 402. The access network also determines control channel occupancy for at least a portion of its coverage area, as shown by block 404. The control channel occupancy may then be used to select one or more sectors from the route update message for the transmission of the TCA message. In particular, the network compares the control channel occupancy in the sector of access to a threshold occupancy level, and determines whether the control channel occupancy is less than or equal to the threshold occupancy level, as shown by block 406. If control channel occupancy is less than or equal to the threshold occupancy level, the network selects all sectors identified in the route update message, as shown by block 408.

If, on the other hand, control channel occupancy is greater than the threshold occupancy, the network uses the pilot-signal strengths included in the route update message to select the sectors for the TCA message. In an exemplary embodiment, the network compares the pilot-signal strength for each sector identified by the route update message to a pilot-strength threshold, as shown by block 410. The network then selects only those sectors having a pilot-signal strength greater than the pilot-strength threshold, as shown by block 412.

In an alternative embodiment, the network may compare the pilot-signal strength of the sector of access with the pilot-signal strength of the other sectors identified in the route update message. The network may then select only those sectors having a pilot-signal strength that is greater than the strength of the sector of access by a predetermined amount, and/or that is within a predetermined range around the strength of the sector of access.

In another alternative embodiment, the network may base sector selection for non-priority communications on control channel occupancy, without considering pilot-signal strength. For instance, the network may determine the control channel occupancy in each sector identified in the most-recent route update message. The network may then compare the control channel occupancy in each sector to a predetermined threshold occupancy (which may be universal across all sectors, or independently defined for each sector). Based on the comparison, the network sends the TCA message in only those sectors where the control channel occupancy is less than the threshold occupancy. Other techniques using the control channel occupancy, alone or in combination with other factors, are also possible.

Control channel occupancy may be measured in various ways. For example, control channel occupancy may be defined as the average of the number of timeslots in use divided by the total number of available timeslots over a predetermined period of time (e.g., 30 minutes). Other techniques for measuring control channel occupancy are also possible. Further, the control channel occupancy level may be representative of the control channel occupancy for a coverage area served by a single BTS, multiple BTSs, a single RNC, multiple RNCs, multiple RANs, or a subsection of the coverage area served by a BTS or RNC, such as a single sector. For example, the control channel occupancy level may be determined in only the sector of access for the requesting access terminal. As another example, the control channel occupancy level may be determined across all sectors identified in the route update message (in the event the route update message identifies multiple sectors), or across a subset of sectors in a wireless access network, such as the sector of access and sectors neighboring or adjacent to the sector of access. In the event the control channel occupancy includes multiple sectors, the control channel occupancy may be considered individually in each sector, may be an average or a mean of the sectors, or may be a weighted average, placing greater weight on the occupancy of the sector of access. Other examples are also possible.

The method may further involve the network transmitting the TCA message in each of the selected sectors, as shown by block 414. In an exemplary embodiment, transmission may be accomplished by including the TCA message in the synchronous and asynchronous capsules of each sector selected. Alternatively, the network may specify, for each selected sector, whether to include the TCA message in the synchronous capsule, in the asynchronous capsule, or in both. Techniques for selecting specific capsules for a TCA message are discussed in greater detail in U.S. patent application Ser. No. 12/209,384, of which this application is a continuation-in-part, and which is incorporated by reference in its entirety.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In a wireless access network that provides wireless service in a coverage area, wherein the coverage area comprises a plurality of sectors, a method comprising:
   receiving a request from an access terminal to engage in a communication session;
   making a determination as to whether or not the communication session is of a type that is designated for priority service; and
   using the determination of whether or not the requested communication session is of a type that is designated for priority service as a basis for selecting one or more sectors in which to transmit a traffic channel assignment message.

2. The method of claim 1, further comprising, in each selected sector, transmitting the traffic channel assignment message.

3. The method of claim 2, wherein transmitting the traffic channel assignment message in a given sector comprises transmitting the traffic channel assignment message via the control channel of the given sector.

4. The method of claim 1, further comprising, if the determination is that the requested communication session is not of a type that is designated for priority service:
   determining control channel occupancy in at least a portion of the coverage area; and using the determined control channel occupancy as a further basis for selecting the one or more sectors in which to transmit a traffic channel assignment message.

5. The method of claim 4, wherein the access terminal is connected to the wireless access network in a sector of access, and wherein the portion of the coverage area in which control channel occupancy is determined comprises the sector of access.

6. The method of claim 4, further comprising receiving a route update message from the access terminal, wherein the route update message identifies one or more sectors, wherein the portion of the coverage area in which control channel occupancy is determined comprises the one or more sectors identified in the route update message.

7. The method of claim 1, further comprising receiving a route update message from the access terminal, wherein the route update message identifies one or more sectors and provides an indication of pilot-signal strength for each identified sector, and using the route update message as a further basis for selecting at least one of the one or more sectors in which to transmit the traffic channel assignment message.

8. The method of claim 7, further comprising:
  determining a control-channel occupancy in the wireless access network;
  wherein using the determination of whether or not the requested communication session is of a type that is designated for priority service as a basis for selecting the one or more sectors in which to transmit a traffic channel assignment message comprises:
    (a) if the determination is that the communication session is of a type that is designated for priority service, then selecting all sectors identified in the received route update message; and
    (b) if the determination is that the communication session is of a type that is not designated for priority service, then using the determined control-channel occupancy level as a further basis for selecting the one or more sectors in which to transmit the traffic channel assignment message.

9. The method of claim 8, wherein using the determined control-channel occupancy as a further basis for selecting the one or more sectors in which to transmit the traffic channel assignment message comprises:
  making a determination of whether or not the determined control-channel occupancy is greater than a threshold occupancy;
  if the determination is that the determined control-channel occupancy is not greater than a threshold occupancy, then selecting all sectors identified in the received route update message; and
  if the determination is that the determined control-channel occupancy is greater than the threshold occupancy, then using the indications of pilot-signal strength for the sectors identified in the route update message as a further basis for selecting the one or more sectors in which to transmit the traffic channel assignment message.

10. The method of claim 9, wherein using the indications of pilot-signal strength for the sectors identified in the route update message as a further basis for selecting the one or more sectors in which to transmit the traffic channel assignment message comprises, for each sector identified in the route update message:
  making a determination of whether the pilot-signal strength for the sector is greater than a pilot-strength threshold; and
  if the determination is that the pilot-signal strength for the sector is greater than the pilot-strength threshold, then selecting the sector as one of the sectors in which to transmit the traffic channel assignment message.

11. The method of claim 1, wherein push-to-talk communication sessions are a type of communication session that is designated for priority service.

12. The method of claim 1, wherein best-effort communication sessions are a type of communication session that is not designated for priority service.

13. The method of claim 1, further comprising designating one or more types of communication sessions for priority service.

14. In a wireless access network that provides wireless service in a plurality of sectors, a method comprising:
  receiving a request from an access terminal to engage in a communication session;
  determining a control channel occupancy for at least a portion of the wireless access network;
  using the determined control channel occupancy level as a basis for selecting one or more sectors in which to transmit a traffic channel assignment message.

15. The method of claim 14, further comprising:
  receiving a route update message from the access terminal, wherein the route update message identifies one or more sectors and provides an indication of pilot-signal strength for each identified sector;
  wherein using the determined control channel occupancy level as a basis for selecting one or more sectors in which to transmit a traffic channel assignment message comprises:
    (a) making a determination of whether or not the determined control-channel occupancy is greater than a threshold occupancy;
    (b) if the determination is that the determined control-channel occupancy is greater than the threshold occupancy, then using the indications of pilot-signal strength for the sectors identified in the route update message as a basis for selecting the one or more sectors in which to transmit the traffic channel assignment message; and
    (c) if the determination is that the control-channel occupancy is not greater than a threshold occupancy, then selecting all sectors identified in the received route update message.

16. The method of claim 15, wherein using the indications of pilot-signal strength for the sectors identified in the route update message as a further basis for selecting the one or more sectors in which to transmit the traffic channel assignment message comprises, for each sector identified in the route update message:
  making a determination of whether the pilot-signal strength for the sector is greater than a pilot-strength threshold; and
  if the determination is that the pilot-signal strength for the sector is greater than the pilot-strength threshold, then selecting the sector as one of the sectors in which to transmit the traffic channel assignment message.

17. A system configured to select one or more sectors in a wireless access network for a transmission of a traffic channel assignment message, the system comprising:
  a communication interface configured to engage in a communication session with an access terminal;
  a processor; and
  instructions stored in data storage and executable by the processor to:
    (a) make a determination as to whether or not the communication session is of a type that is designated for priority service; and (b) use the determination as to whether or not the communication session is of a type that is designated for priority service as a basis to select one or more sectors for a transmission of a traffic channel assignment message.

18. The system of claim 17, wherein the system is further configured to: determine control-channel occupancy in at least a portion of the wireless access network; and use the control-channel occupancy as a further basis to select the one or more sectors for the transmission of the traffic channel assignment message.

19. The system of claim 17, wherein the system is further configured to: determine a pilot-signal strength for each sector that is identified in a route update message received from an access terminal; and use the pilot-signal strength for the sectors identified in the route update message as a further basis to select the one or more sectors for the transmission of the traffic channel assignment message.

20. The system of claim 17, wherein the system is further configured to:

receive a route update message from the access terminal, wherein the route update message identifies one or more sectors;

if the communication session is designated for priority service, select all sectors identified in the route update message; and if the communication session is not designated for priority service:
  (a) determine control-channel occupancy in at least a portion of the wireless access network;
  (b) if the control-channel occupancy is less than or equal to a threshold occupancy, select all sectors identified in the route update message; and
  (c) if the control-channel occupancy is greater than the threshold occupancy, select only those sectors that are identified in the route update message and have a pilot-signal strength greater than a pilot-signal strength threshold.

21. The system of claim 17 further comprising a database that identifies one or more types of communication sessions that are designated for priority service.

22. The system of claim 21, further comprising instructions stored in data storage and executable by the processor to query the database to determine whether or not the requested communication session is of a type that is designated for priority service.

* * * * *